(12) United States Patent
Hagan et al.

(10) Patent No.: US 8,703,675 B2
(45) Date of Patent: Apr. 22, 2014

(54) BEARING GREASE COMPOSITION

(75) Inventors: Timothy J. Hagan, Succasunna, NJ (US); Vincent DiMartino, Wayne, NJ (US)

(73) Assignee: Saint-Gobain Performance Plastics Corporation, Aurora, OH (US)

( * ) Notice: Subject to any disclaimer, the term of this patent is extended or adjusted under 35 U.S.C. 154(b) by 100 days.

(21) Appl. No.: 12/421,395

(22) Filed: Apr. 9, 2009

(65) Prior Publication Data

US 2009/0258802 A1 Oct. 15, 2009

Related U.S. Application Data

(60) Provisional application No. 61/043,554, filed on Apr. 9, 2008, provisional application No. 61/043,529, filed on Apr. 9, 2008.

(51) Int. Cl.
F16C 33/06 (2006.01)
C10M 159/06 (2006.01)
C10M 169/02 (2006.01)

(52) U.S. Cl.
USPC ............................ 508/450; 508/100; 508/591

(58) Field of Classification Search
USPC ......................................... 508/100, 450, 591
See application file for complete search history.

(56) References Cited

U.S. PATENT DOCUMENTS

| | | |
|---|---|---|
| 1,236,600 A | 8/1917 | Paul |
| 2,665,956 A | 1/1954 | Heim |
| 2,814,538 A | 11/1957 | Connolly |
| 2,843,548 A | 7/1958 | Westlund, Jr. et al. |
| 2,922,682 A | 1/1960 | Abel |
| 2,995,462 A | 8/1961 | Conrad et al. |
| 3,162,930 A | 12/1964 | Litsky |
| 3,642,633 A | 2/1972 | Eckert et al. |
| 3,883,439 A | 5/1975 | Bergeron |
| 4,260,205 A | 4/1981 | Spies |
| 4,304,678 A | 12/1981 | Schick et al. |
| 4,357,249 A | 11/1982 | Mellor |
| 4,406,800 A | 9/1983 | Christian |
| 4,613,712 A | 9/1986 | Bridger |
| 4,749,502 A | 6/1988 | Alexander et al. |
| 4,923,624 A | 5/1990 | Albanesi |
| 5,056,938 A | 10/1991 | Ahlman et al. |

(Continued)

FOREIGN PATENT DOCUMENTS

| | | |
|---|---|---|
| CN | 1262723 A | 8/2000 |
| CN | 1293173 C | 1/2007 |

(Continued)

OTHER PUBLICATIONS

ExxonMobile, 48133-60 Mobile 1 0W-40 Material Safety Data Bulletin, Apr. 11, 2002, 8 pages, CRC Press.

(Continued)

*Primary Examiner* — Prem Singh
*Assistant Examiner* — Vishal Vasisth
(74) *Attorney, Agent, or Firm* — Abel Law Group, LLP; Chi Suk Kim

(57) ABSTRACT

A grease for use in fluid bearings can be made by combining a synthetic oil and a paraffinic wax. The grease can adhere to polymeric surfaces on bearings such as PTFE and can improve service life in high speed bearings such as those used in electric motors.

18 Claims, 7 Drawing Sheets

(56) References Cited

U.S. PATENT DOCUMENTS

| | | | |
|---|---|---|---|
| 5,209,499 A | 5/1993 | Ruff et al. | |
| 5,219,232 A | 6/1993 | Adams et al. | |
| 5,230,569 A | 7/1993 | Sheedy | |
| 5,398,294 A | 3/1995 | Narkon | |
| 5,401,574 A | 3/1995 | Masutani et al. | |
| 5,558,807 A | 9/1996 | Kim | |
| 5,643,683 A | 7/1997 | Tanaka et al. | |
| 5,851,663 A | 12/1998 | Parsons et al. | |
| 5,939,367 A | 8/1999 | Cuse | |
| 5,998,339 A | 12/1999 | Kato et al. | |
| 6,095,690 A | 8/2000 | Niegel et al. | |
| 6,162,767 A | 12/2000 | Adam | |
| 6,500,787 B1 * | 12/2002 | Tanaka et al. | 508/451 |
| 6,548,188 B1 | 4/2003 | Yanase et al. | |
| 6,689,723 B2 | 2/2004 | Sullivan et al. | |
| 7,053,028 B2 | 5/2006 | Kawamura et al. | |
| 2003/0060375 A1 | 3/2003 | Grainger et al. | |
| 2003/0060376 A1 | 3/2003 | Hirata et al. | |
| 2003/0069147 A1 | 4/2003 | Kawamura et al. | |
| 2003/0179966 A1 | 9/2003 | Hojo | |
| 2004/0258335 A1 | 12/2004 | Shimizu et al. | |
| 2005/0196082 A1 | 9/2005 | Asfour et al. | |
| 2006/0002643 A1 | 1/2006 | Aubele | |
| 2006/0003904 A1 * | 1/2006 | Maeda et al. | 508/390 |
| 2006/0030500 A1 | 2/2006 | Ota et al. | |
| 2006/0175123 A1 * | 8/2006 | Yabe et al. | 180/444 |
| 2007/0000807 A1 | 1/2007 | Wu et al. | |
| 2007/0021544 A1 | 1/2007 | Yanase et al. | |
| 2007/0155633 A1 | 7/2007 | Nalesnik | |
| 2008/0161214 A1 | 7/2008 | Asakura et al. | |
| 2009/0257694 A1 | 10/2009 | Hunter et al. | |

FOREIGN PATENT DOCUMENTS

| | | |
|---|---|---|
| EP | 0521645 | 1/1993 |
| EP | 0570625 A2 | 11/1993 |
| EP | 0631060 | 12/1994 |
| EP | 1305530 | 5/2003 |
| EP | 1 803 792 A1 | 7/2007 |
| EP | 1803792 A1 | 7/2007 |
| GB | 567905 | 3/1945 |
| GB | 731348 A | 6/1955 |
| JP | 55006005 A | 1/1980 |
| JP | 55072917 A | 6/1980 |
| JP | 56149484 A | 11/1981 |
| JP | 56150623 A | 11/1981 |
| JP | 59047517 A | 3/1984 |
| JP | 60-031598 | 2/1985 |
| JP | 02-046315 A | 2/1990 |
| JP | 09-194867 | 7/1997 |
| JP | 10213129 A | 8/1998 |
| JP | 2001-090729 | 4/2001 |
| JP | 2003-003185 | 1/2003 |
| JP | 2003021144 A | 1/2003 |
| JP | 2003699960 A | 1/2003 |
| JP | 2005163957 A | 6/2005 |
| RU | 2290416 C2 | 12/2006 |
| WO | 89/06681 A1 | 7/1989 |
| WO | 9703152 A1 | 1/1997 |
| WO | 97/28379 A2 | 8/1997 |
| WO | 9902873 A1 | 1/1999 |
| WO | 2004/040155 A | 5/2004 |
| WO | 2005007741 A1 | 1/2005 |
| WO | 2008013697 A2 | 1/2008 |

OTHER PUBLICATIONS

NLGI, Lubricating Grease Guide, 2006, 10 pages, Fifth Edition, Library of Congress Catalog Card No. : 84-61641.
Kirk-Othmer, Lubrication and Lubricants, Encyclopedia of Polymer Science and Technology, vol. 15, 6 pages.
Nachi, Nachi Technical Center, Lubrication, downloaded from the Internet Jan. 8, 2010, 9 pages.
E. Richard Booser, Tribology Data Handbook, An Excellent Friction, Lubrication and Wear Resource, 1997, 4 pages.
Tribology & Lubrication Technology Systems, Strategies & Research for Lubrication Professionals, 32 pages.
Written Opinion of the International Searching Authority dated Jul. 31, 2009 issued in corresponding PCT International Application No. PCT/US2009/040080, 8 pages.
International Preliminary Report on Patentability, dated Oct. 21, 2010, received in International Patent Application No. PCT/US2009/040080, 6pgs.
International Search Report dated Nov. 23, 2009 issued in PCT Application No. PCT/US2009/010071, 1 pg.
International Search Report dated Jul. 31, 2009 issued in corresponding PCT Application No. PCT/US2009/040080, 1 pg.

* cited by examiner

BEARING GREASE COMPOSITION

RELATED APPLICATIONS

This application claims benefit of U.S. Provisional Patent Application Ser. No. 61/043,529, titled "BEARINGS" filed Apr. 9, 2008 and claims benefit of U.S. Provisional Patent Application Ser. No. 61/043,554, titled "BEARING GREASE COMPOSITION" filed Apr. 9, 2008. Both applications are hereby incorporated by reference herein.

BACKGROUND

1. Field of Invention

The invention relates to grease compositions and, in particular, to grease compositions for fluid bearings.

2. Discussion of Related Art

Fluid bearings, or fluid dynamic bearings, differ from mechanical bearings in that the bearing surfaces (faces) are separated by a liquid or gas rather than by balls or other mechanical means. The fluid layer supports the inner face and keeps the inner and outer bearing faces from contacting. This hydrodynamic layer can allow one face to rotate in relation to the other while being supported by, but not in contact with, the other face. The fluid provides some resistance when the bearing is rotated and typically a lower viscosity fluid provides less resistance. However, lower viscosity fluids may flow more easily than do higher viscosity fluids, and retaining a layer of adequate thickness between the faces may be more difficult with lower viscosity fluids. Therefore, many bearings include a lubricant, such as an oil, as well as a thickener, such as a soap of a metallic salt. These compositions have been able to provide low levels of resistance to rotation as well as an adequate rate of retention in the bearing.

SUMMARY OF INVENTION

The subject matter of this application may involve, in some cases, interrelated products, alternative solutions to a particular problem, and/or a plurality of different uses of a single system or article.

In one aspect, a high speed bearing grease composition is provided, the grease composition comprising a synthetic hydrocarbon and a wax.

In another aspect, a bearing grease is provided, the bearing grease comprising a polyalphaolefin having a D-445 viscosity of less than 150 cSt at 100° C. and a wax.

In another aspect, a bearing assembly is provided, the bearing assembly comprising a bearing comprising two opposed surfaces constructed and arranged to move independently of each other, at least one of the surfaces comprising a polymer, and a lubricant layer between the opposed surfaces, the lubricant comprising a synthetic hydrocarbon and a paraffinic wax.

In another aspect, a high speed seal less hydrodynamic bearing is provided, the bearing comprising two opposed bearing surfaces, at least one of the surfaces comprising a polymer, and a lubricant positioned between the bearing surfaces wherein the bearing is capable of operating at a sliding velocity of greater than 1 m/s for a period of greater than 1000 hours.

DETAILED DESCRIPTION

Figure 1:
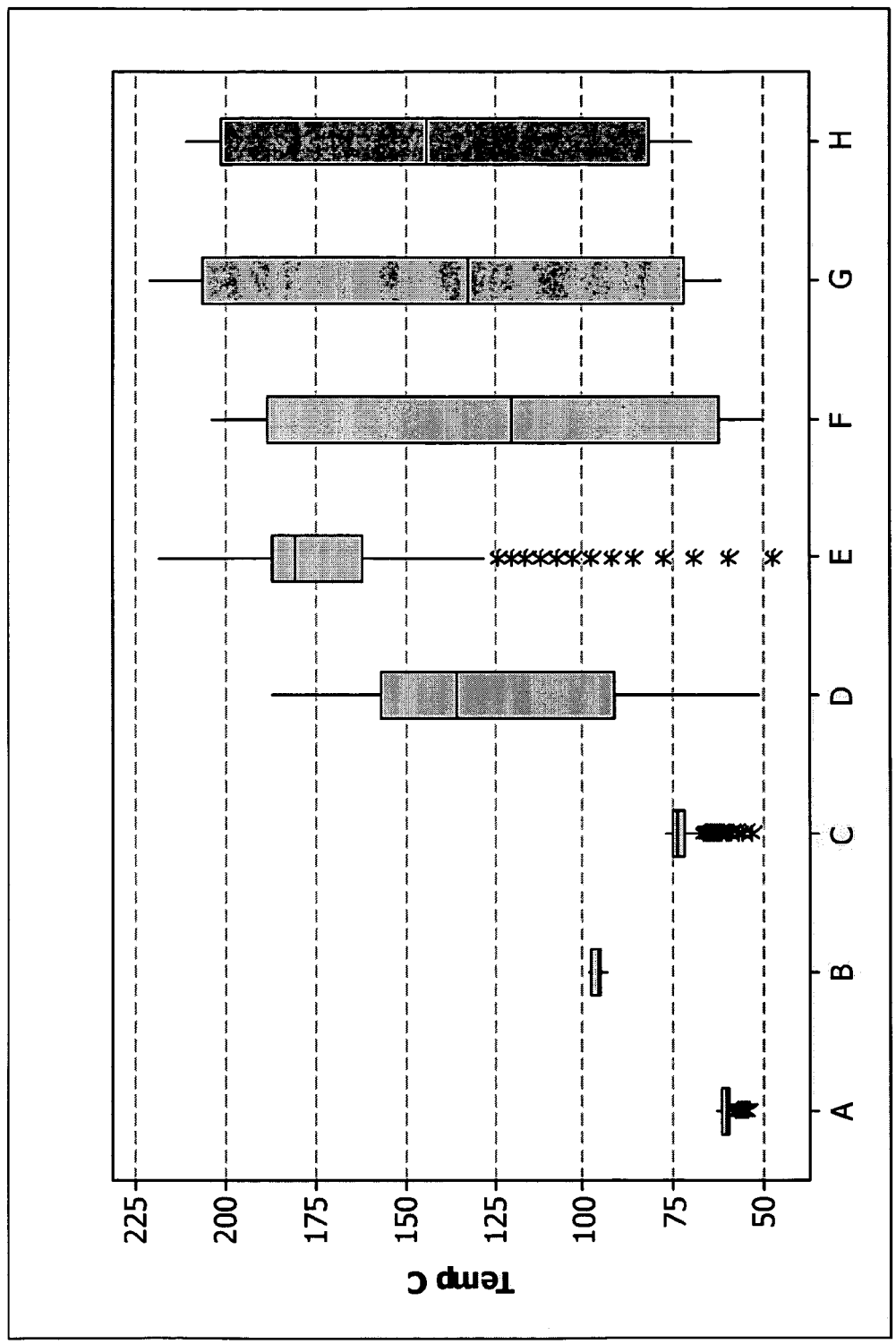
FIG. 1 is a box graph illustrating test results.

In one aspect, a grease composition for use in fluid dynamic bearings is described. The bearing may be, for example, a sleeve bearing, journal bearing or bushing such as that described in co-pending U.S. patent application Ser. No. 12/421,299 titled BEARINGS filed on even-date herewith, which is hereby incorporated by reference herein. The bearings may be high speed bearings, e.g., those operating at surface velocities of greater than 1 m/s, or exhibiting a Pressure×Velocity (PV) of greater than 1 MPa·m/s. These fluid dynamic bearings do not contain rolling elements and provide quiet, compact, inexpensive bearings that can be used in a variety of high speed applications. The bearings may be hydrodynamic, may be seal less, and may be run continuously without supplementing or circulating a lubricant. Bearing lifetime may be more than 2000, 3000 or 4000 hours without servicing. At least one of the bearing surfaces may include (be made of) a polymer such as a fluoropolymer. Under these conditions, it has been found that conventional greases are unable to provide an adequate fluid layer for service periods that are desired of these bearings in many applications. The grease compositions described herein have been shown to provide thousands of hours of continuous service in these bearings, without circulating, replacing or supplementing the grease in the bearing.

The grease may include 2 or more components that can be an oil lubricant and a wax thickener. The oil may be, for example, a hydrocarbon or a synthetic oil such as a polyalphaolefin (PAO). The thickener may be a paraffinic wax. A third component may be an oil stabilizer such as Lucas® Heavy Duty Oil Stabilizer. Lucas Oil Stabilizer is a hydrocarbon based material designed for use with internal combustion engines. The grease may be free of non-wax thickeners such as polyureas, lithium compounds, organo-clays, and silica.

The oil fraction of the grease composition may form more than 50%, more than 60%, more than 70% or more than 80% of the grease composition by volume. The oil fraction may also account for less than 95%, less than 90%, less than 80% or less than 70% of the grease, by volume. In one embodiment the oil fraction accounts for 62% of the grease composition, by volume. The wax fraction may contribute by volume more than 5%, more than 10%, more than 15%, more than 20% or more than 25% to the grease composition. In one embodiment, the wax accounts for 19% of the composition, by volume. The oil stabilizer fraction may contribute, for example, 0%, more than 1%, more than 5%, more than 10% or more than 15%, by volume to the grease composition. In one embodiment, the oil stabilizer accounts for 19% of the composition, by volume.

The grease may be used in a variety of high speed bearings including those used in electric motors. One or more of the bearing surfaces can include (is made of) a polymer. The polymer may be a fluoropolymer such as polytetrafluoroethylene (PTFE). The bearing liner may be metal, alloy or polymer and may be a composite such as a polymer layer adhered to a metallic backing. Polymeric layers on bearing surfaces may include additional components such as graphite, carbon black, carbon fiber, glass fibers, molybdenum disulfide, mica, wollastonite, bronze, copper, stainless steel, aluminum oxide, tungsten disulfide, boron nitride, calcium fluoride, aramid fibers, basalt, fibers, pigments, temperature resistant polymer powders, or aromatic polyesters, e.g., EKONOL. Surface materials may also include filled polyimides such as bronze filled polyimides. The rotating component of the bearing may be metal, alloy, polymer, or a combination thereof. The diametrical clearance gap between rotating and stationary coaxial components of a bearing may be less than 0.1 mm and may be in the range of 0.013 to 0.076 mm. The grease provides a low viscosity fluid in this clearance gap on which the moving component of the bearing, and any associated shaft, can be supported. It is believed that the grease described herein exhibits specific properties that provide for improved wetting of the polymeric surface allowing the grease to provide a sufficient fluid layer between the opposed coaxial surfaces without requiring replacement for extended periods of time, or even for the life of the bearing.

It is believed that this grease composition exhibits increased capillary action in a gap that is defined by a fluoropolymer surface and a metallic surface. This increased capillary action attracts the grease to the gap and prevents the grease from being squeezed from the gap even when in a liquid state and under load. This improved capillary action may be a result of a high degree of wettability with the fluoropolymer surface when compared to available greases. The result is a grease that can provide a low viscosity liquid layer for a fluid bearing without being forced from the bearing gap, even under high loads and at high speeds. The grease can also be formulated to exhibit exceptional oxidation resistance.

The oil fraction of the grease may be a natural or synthetic hydrocarbon. Synthetic hydrocarbons include Group V base oils (synthetic esters and polyalkylene glycols) and Group IV base oils (polyalphaolefins (PAO).) Other synthetic oils include, for example, polyol esters, silicones, polyinernalolefins, esters, neutral phosphate esters, polymer esters, polyakylene glycols, alkylated aromatics, perfluoroalkylpolyethers, polyphenyl ethers, cyclohydrocarbons, polychlorotrifluoroethylenes, silahydrocarbons, phosphazenes, dialkyl carbonates, alkylcyclopentanes, polybutenes, or chemically modified mineral oils. Non-synthetic oils include, for example, naphthenic mineral oils, and paraffinic mineral oils. Polyalphaolefins are known to those skilled in the art and are typically made by polymerizing α-olefins having from 6 to 12 carbon atoms. In certain embodiments, either 8, 9, 10, 11 or 16 carbon α-olefins may be preferred. A specific PAO may be a mixture of monomers, dimers, trimers and tetramers. The PAO in the grease may be an oligomer or mixture of oligomers that can be selected to arrive at a desired viscosity range.

In some embodiments, the oil fraction may have a kinematic viscosity at 100° C. of 10 to 1000 cSt, 20 to 500 cSt or 50 to 150 cSt. At 40° C. the kinematic viscosity may be in the range of 1 to 100 cSt, 5 to 50 cSt or 5 to 20 cSt. Complex viscosity at 100° C. may be from 0.1 to 0.001 Pa-S, from 0.05 to 0.003 Pa-S, or from 0.02 to 0.005 Pa-S. The difference in the complex viscosity of the oil between 40° C. and 100° C. may be less than a factor of 20 or less than a factor of 10. In some embodiments, the difference in the complex viscosity of the oil between 40° C. and 100° C. may be greater than a factor of 5, greater than a factor of 10 or greater than a factor of 20. In these cases, the grease may have a dynamic viscosity (parallel plate) at 40° C. that is 5 times, 10 times, or 15 times greater than the dynamic viscosity at 70° C. The viscosity index (VI) may be, for example, from 10 to 1000, 50 to 500, or 100 to 300. The oil may have any appropriate density and may be in the range of 0.70 to 0.95 g/cm$^3$ or in the range of 0.80 to 0.90 g/cm$^3$. The molecular weight of the oil component may be, for example, between 100 and 10,000 or between 300 and 1000, or between 600 and 900. A preferred PAO has an average molecular weight of about 761 with a number average of about 610 and a polydispersity index of about 1.25.

In one set of embodiments, the oil fraction may be a commercially available group IV or group V motor oil such as Mobil 1® 0W-40. Some of the properties of Mobil 1 0W-40 are provided below in Table 1.

TABLE 1

| Property | Value |
|---|---|
| Viscosity D445 at 40° C. | 78.3 cSt |
| Viscosity D445 at 100° C. | 14 cSt |
| Sulfated Ash D874 | 1.2 wt % |
| Phosphorous | 0.1 |
| Flash Point D92 | 230° C. |
| Density by D4052 | 0.85 kg/L |
| Total Base Number | 11.3 |
| MRV at −40° C. | 26242 |
| Viscosity Index (VI) | 186 |
| HTHS Viscosity, D4683, mPas@150° C. | 3.7 |

A sample of Mobil 1 0W-40 was also analyzed by mass spectroscopy. Compounds that were detected are provided below in Table 2. Any of these compounds or combinations thereof may form a grease component.

TABLE 2

| Mobil 1 0W-40 Composition |
|---|
| Decane |
| Benzene, 1-ethyl-3-methyl |
| Benzene, 1,2,3-trimethyl |
| Decane, 2-methyl |
| Decane, 3-methyl |
| Undecane |
| Dodecane |
| Benzene, 1-methyl-2-(1-methylethyl) |
| Tridecane |
| Naphthalene |
| Tetradecane |
| 1-Hexadecene |
| Tetratetracontane |
| Pentadecane |
| Sulfurous acid, butyl tridecyl ester |
| Phenol, 2,6-bis(1,1-dimethylethyl) |
| Dodecane, 2,6,11-trimethyl |
| Hexadecane |
| Octadecane |
| Nonahexacontanoic acid |
| Heneicosane |
| Nonadecane |
| Pentacosane |
| Hexadecane, 7,9-dimethyl |
| Tricosane |
| Docosane |
| Tetracosane |
| Hexacosane |
| Eicosane |
| Octacosane |

The thickener component of the grease can be a paraffinic wax that may have a melting point between 50 and 150° C., between 70 and 120° C., or between 90 and 110° C. The wax may include predominantly alkanes from $C_{11}$ to $C_{28}$. The wax may also include an antioxidant such as BHT and may have some aromatic content such as benzene derivatives including 1-ethyl-3,5-dimethyl benzene and 1,2,4-triethyl benzene. In preferred embodiments the wax may have a melting point in the range of or 25° C. to 200° C., 50° C. to 150° C. or 75° C. to 125° C. In one embodiment a low temperature ski wax such as Bakoda® cold temperature ski wax has been shown to work well.

A sample of Bakoda cold temperature ski wax was also analyzed by mass spectroscopy. Compounds that were detected are provided below in Table 3. Any of these compounds or combinations thereof may form a grease component.

TABLE 3

Bakoda Ski Wax Composition

Heptane, 2,2,6,6-tetramethyl-4-methylene
3-Heptene, 2,2,4,6,6-pentamethyl
Cyclohexane, 1-methyl-2-pentyl
4-Undecene, 4-methyl
Dodecane
Sulfurous acid, cyclohexamethyl tetradecyl ester
1-Hexadecene
1-Eicosene
Docosane
Tricosane
Hexacosane
Heptacosane
Octacosane
Cyclotetradecane, 1,7,11-trimethyl-4-(1-methylethyl)

The grease may also include an additive component such as a viscosity modifier and/or antiwear (AW) and/or extreme pressure (EP) additives. These compounds may be, for example, sulfur or phosphorus based materials. The additive may be free of metals and metallic salts and soaps. The additive may have a viscosity that is greater than that of the base oil. For instance, kinematic viscosity of the additive at 100° C. may be greater than 50 cSt or greater than 100 cSt. The additive component may be an oil stabilizer that is hydrocarbon based and includes various alkanes from C12 to C22, C23, C26, C27 and C28. The oil stabilizer may also include cyclic compounds such as C6 and C14 cyclic alkanes with optional pendent groups. It may include highly branched alkanes. It may also contain olefin monomers and/or alpha-olefin monomers. The molecular weight of the additive may be, for example, from 500 to 5000 and in some cases is from 500 to 2000 or from 750 to 1500. The stabilizer may also include a sulfur based antiwear additive and/or may be substantially free of metals. An example of an appropriate oil stabilizer is Lucas Heavy Duty Oil Stabilizer available from Lucas Oil Products. Lucas Heavy Duty Oil Stabilizer is a petroleum based stabilizer having a kinematic viscosity of 107 cSt at 100° C. Gel permeation chromatography (GPC) has indicated a weight average molecular weight of 1270 and a number average molecular weight of 823. The polydispersity index was 1.54.

A sample of Lucas Heavy Duty Oil Stabilizer was analyzed by mass spectroscopy. Compounds that were detected are provided below in Table 4. Any of these compounds or combinations thereof may form a grease component.

TABLE 4

Lucas Heavy Duty Oil Stabilizer Composition

Undecane
Dodecane
Benzene, 1-ethyl-3,5-dimethyl
Benzene, 1,2,4-triethyl
Nonanoic acid, ethyl ester
Tetradecane
Pentadecane
Hexadecane
Butylated Hydroxytoluene
Heptadecane
Eicosane
Nonadecane
Benzyl Benzoate
Heneicosane
Docosane
Tricosane
Tetracosane
Pentacosane
Hexacosane
Docosane
Octacosane The grease can be made by first melting the wax and then mixing in the oil fraction. Mixing can continue as the grease cools to reduce any settling of the wax. Upon cooling, a paste-like grease composition results. An oil stabilizer may be mixed into the composition before or after the oil fraction is added to the wax.

An experimental grease designated "A" was formulated using 62% by volume of Mobil 1 0W-40 synthetic oil, 19% by volume of Bakoda cold temperature ski wax and 19% by volume of Lucas Oil Stabilizer. The wax was melted and mixed with the synthetic oil and the oil stabilizer. The resulting grease was tested for oxidative stability using a modified ASTM D-5483 test procedure. To compare grease "A" to a state-of-the-art grease designed for similar applications, an electric motor bearing grease, Mobil Polyrex® EM, was also tested. Each grease sample was placed in an aluminum dish and was transferred to a PDSC test cell. Testing proceeded under 500 psi of pure dry oxygen. The temperature was ramped from room temperature to 210° C. at 60° C. per minute and then held at 210° C. The oxidation time for each grease is provided below in Table 5.

TABLE 5

| | Grease | |
|---|---|---|
| | Mobil Polyrex EM | Experimental Grease A |
| Oxidation Induction Time | 3.33 min. | 49.91 min. |

The results of this test indicate a much greater oxidative stability for grease A than for the commercially available Polyrex EM.

Grease "A" was evaluated further against commercially available products by performing a standard test using the Falex model "Journal Bearing" grease testing apparatus. The bearing surface tested was NORGLIDE® PRO with EKONOL a surface that includes a layer of PTFE containing EKONOL on steel/bronze. The test was performed at a load of 3 MPa and a test speed of 2 m/s. Temperature was measured on the outer bearing surface. Testing was stopped after the temperature for a specific grease exceeded 200° C. The greases that were evaluated and the results of the test are provided in Table 6, below. FIG. 1 provides a box graph showing a comparison of the results. Each box in FIG. 1 represents the range of temperatures recorded for that specific grease.

TABLE 6

| Grease ID | Grease Description | Temp. (° C.) | Comments |
|---|---|---|---|
| A | Grease "A" | 62 | Consistent temperature |
| B | Amsoil Pro | 98 | Consistent temperature |
| C | 1:1 mixture by weight of lithium grease and Mobil 1 0W-40. | 75 | Consistent temperature |
| D | ST-80 wheel bearing grease | 175 | Variable 125-175° C. |
| E | Fluorocarbon grease gel 880 | 200 | Constant temp. increase |
| F | MK high temp. grease | 200 | Immediate temperature rise |
| G | Shin-Etsu Grease | 200 | Immediate temp rise |
| H | DC34Q Thermal Grease | 200 | Immediate temp rise |

Results show that under identical conditions, experimental grease "A" provided better lubrication resulting in a significantly lower operating temperature than any of the commercially available products. This indicates that when used in a high speed bearing and compared to these conventional greases, grease A provides lower temperature operation, less friction, and longer bearing life.

In another experiment, grease "A" was applied to the 19.05 mm bearing (shaft diameter) described in co-pending U.S. patent application Ser. No. 12/421,299 titled BEARINGS, filed on even date herewith. The bearing liner was a NORGLIDE PRO material of PTFE/graphite on steel. The bearing clearance was 0.025 mm. The bearing was tested for over 1350 hours at 2000 rpm under a 1112 N load. Torque was kept constant and the temperature of the bearing was recorded over time. Bearing temperature did not exceed 58° C. over the test period and after the test period the bearing liner showed no signs of wear.

Figure 2:
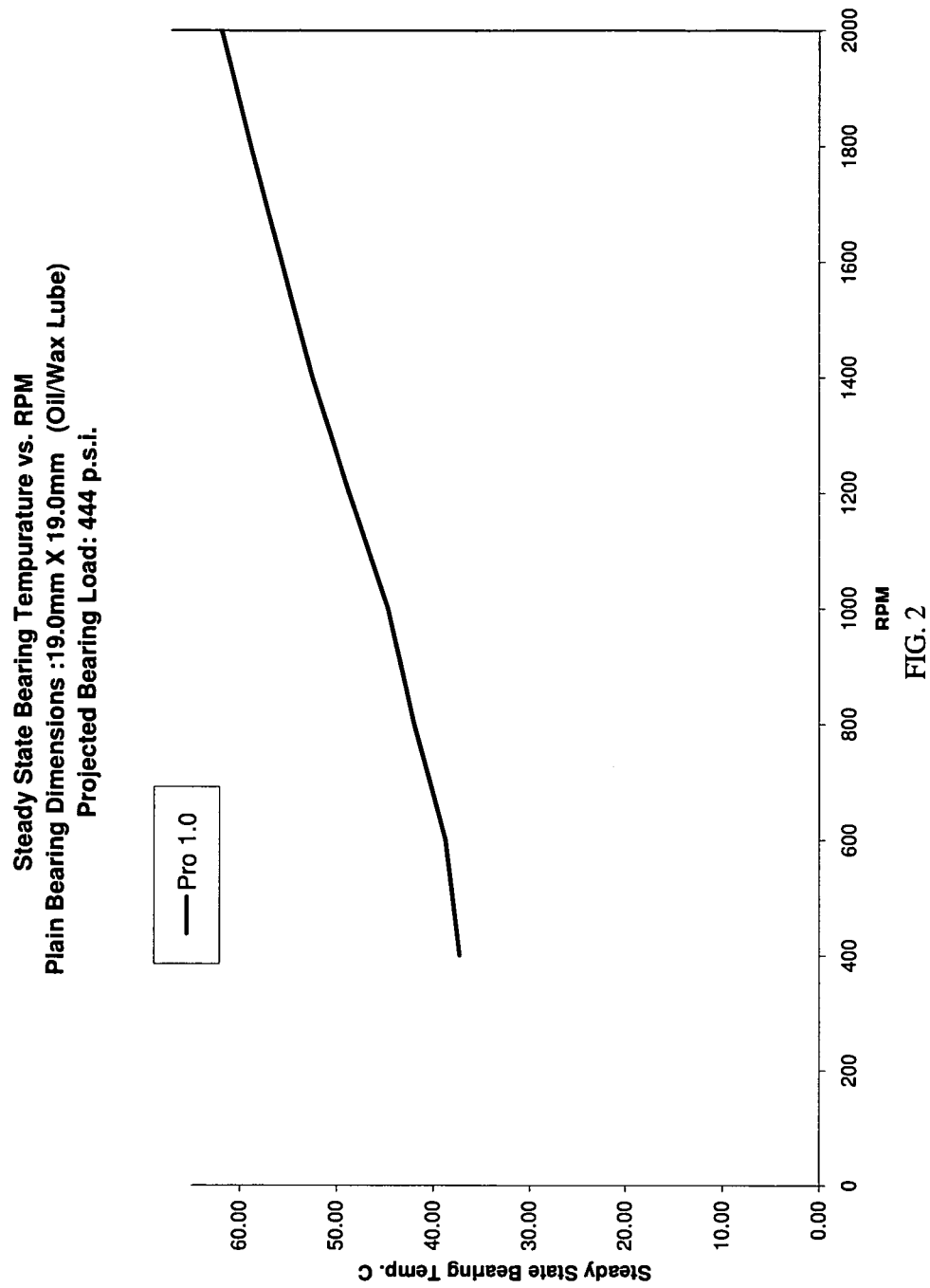
FIG. 2 is a graph illustrating temperature vs. speed for one embodiment.

A similar test was run on the same bearing with the same grease except that the speed of the bearing was increased and temperature was recorded at different bearing speeds. FIG. 2 provides results in graphical form.

Figure 3:
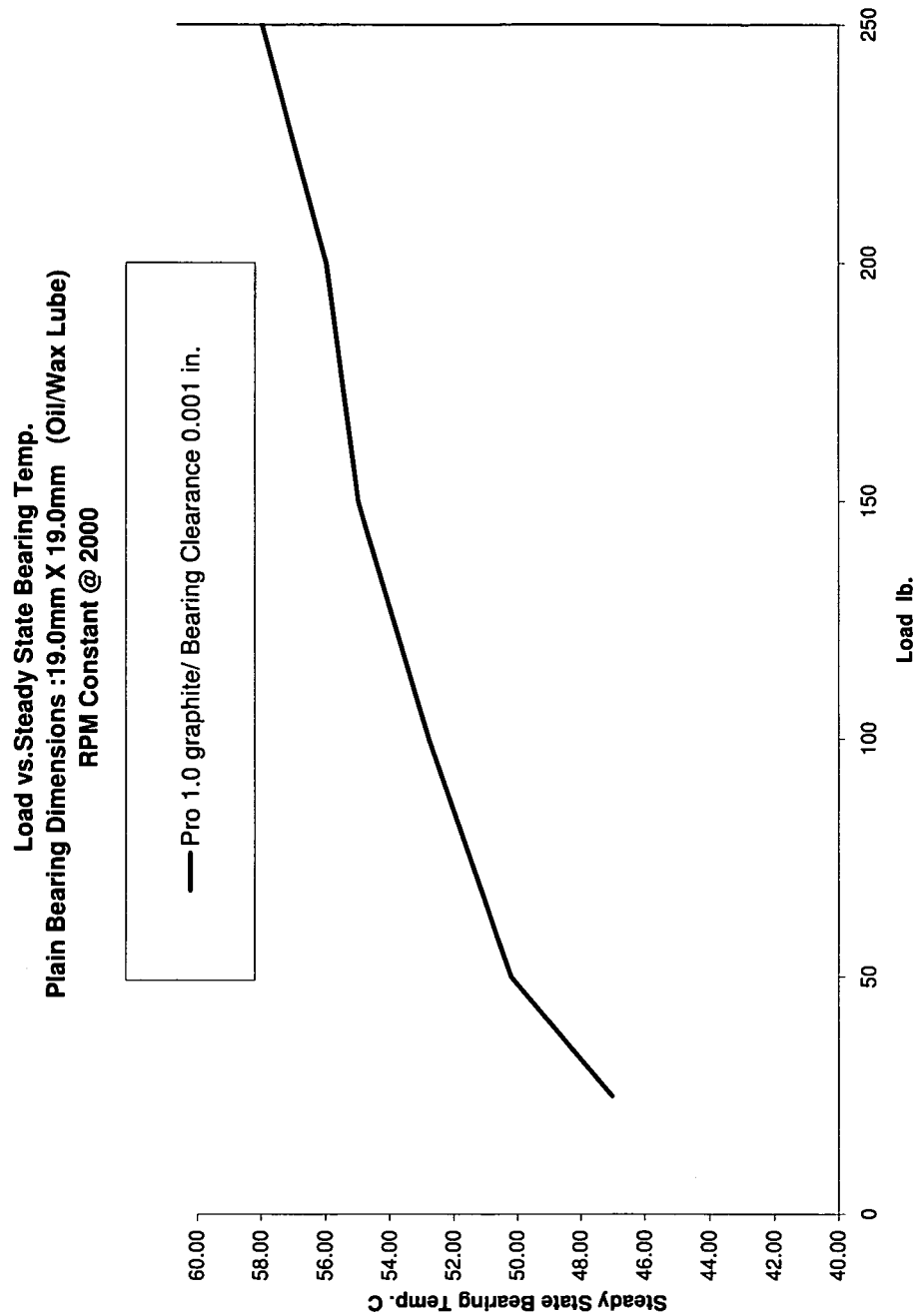
FIG. 3 is a graph illustrating temperature vs. load for one embodiment.

Another test was run using the same bearing and grease "A" to evaluate the effect of a change in load. Bearing speed was kept constant at 2000 rpm and the load was increased from 20 lb to 250 lb while temperature was monitored. Results are provided in FIG. 3 and illustrate that temperature increases gradually with an increase in load and increases at a reduced rate as the load increases.

Long term testing in the Falex Journal Bearing instrument is ongoing. To date, a PTFE bushing with a diametrical clearance gap of 0.0254 mm has been operated with Grease A placed in the clearance gap prior to testing. The bearing was operated at 2000 rpm under a load of 200 lb.

Figure 4:
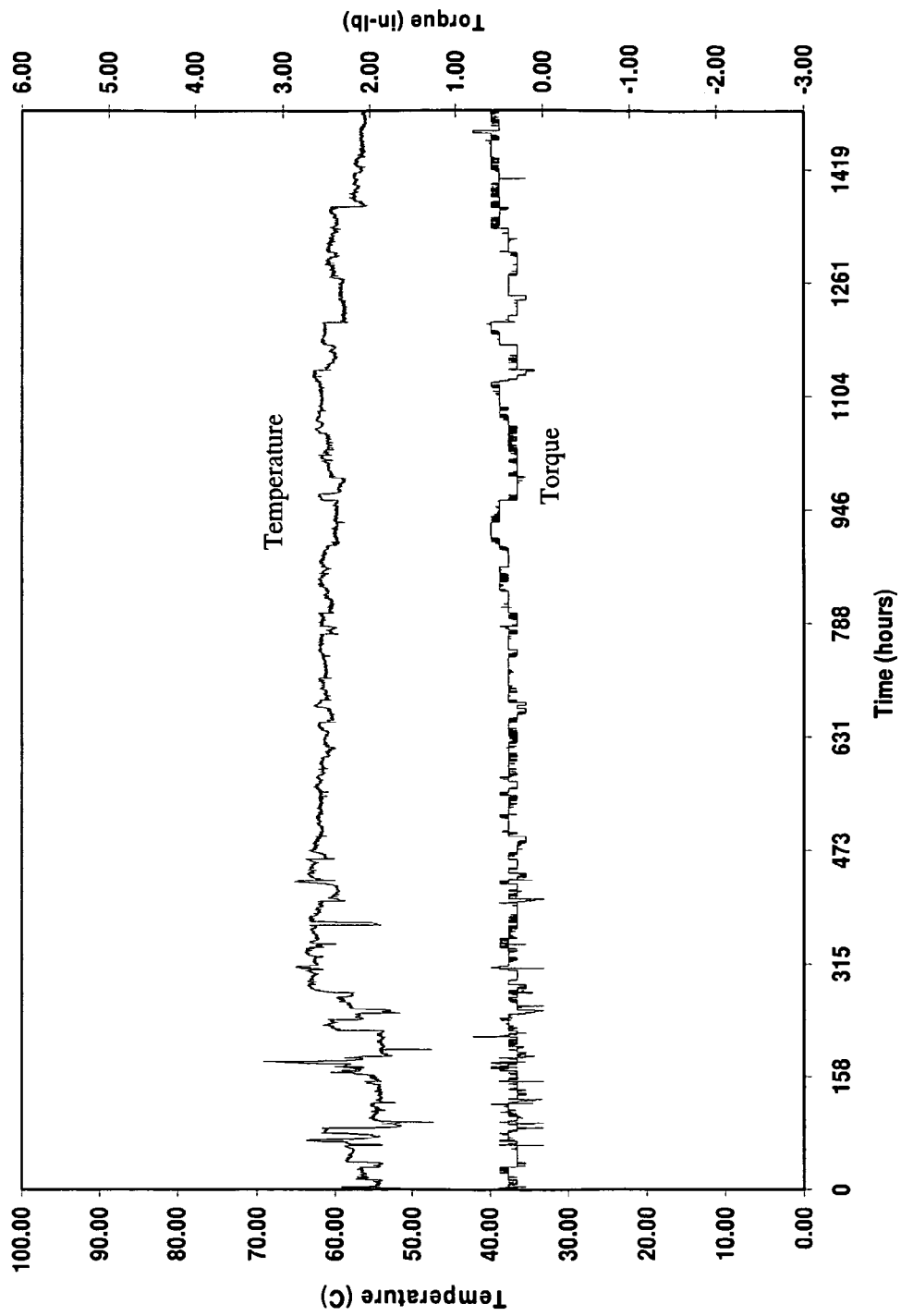
FIG. 4 provides graphical results for temperature and torque for a long term test of one embodiment.

A grease including 50% Mobil 0W-40 and 50% Bakoda ski wax (no oil stabilizer) was formulated and tested for a period of greater than 1500 hours of continuous service using the Falex Journal Bearing instrument. A PTFE bushing was used, having a diametrical gap of 0.0254 mm. FIG. 4 provides temperature and torque results in graphical form for this test. Steady state temperature remained below 60° C. and torque remained well below 1 in-lb (0.113 Nm). This indicates a low coefficient of friction under operating conditions and a reduced level of bearing wear.

Figure 5:
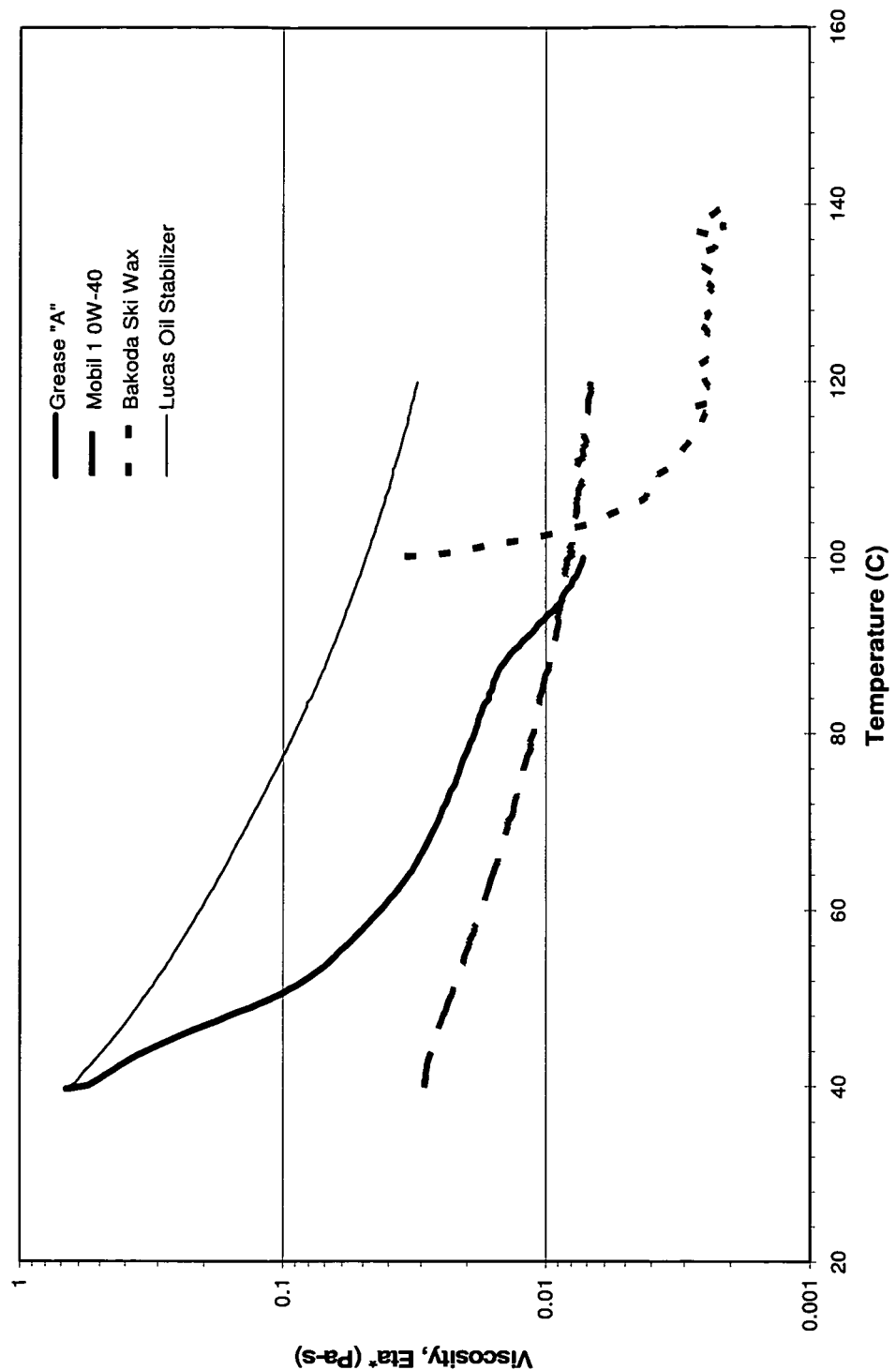
FIG. 5 is a graph illustrating the complex viscosity of one embodiment of a grease and of its individual components.

FIG. 5 graphically displays the complex viscosity of one embodiment of the grease as well as the three independent components that make up the embodiment. The complex viscosity of Grease A, its 3 primary components, and three commercially available bearing greases was determined using the following technique.

A TA Instruments ARES rotational rheometer with a parallel plate geometry was used to conduct a dynamic temperature sweep test. A pea-sized sample of the fluid or grease was deposited on the lower portion of a pair of disposable 50 mm aluminum plates. Plates were used as received. The top plate was lowered until contacting the fluid and the oven was closed around the parallel plate portion of the rheometer. The temperature was raised to 40° C. and held until system was in equilibrium, about 5 minutes. The top plate was then lowered until liquid oozed from edges of plates. An analysis program was then initiated. For the commercial greases (ST-80 HG Heat Dip, Nye lubricant Fluorocarbon Gel 880 FG, and Amsoil Semi-fluid 00 Synthetic EP Grease Lithium Complex) the temperature was ramped from 20 to 120° C. at 3° C./min. For Grease A, the maximum temperature was 100° C. with the same heating rate. The Bakoda wax was heated to 100° C., equilibrated and squished, and ramped to 140° C. at 3° C./min. A frequency of 10 Hz was used for all tests. The commercial greases were tested with a 0.5 mm gap between the plates and a 0.5% strain based on the gap distance. The oil, wax, stabilizer, and grease "A" were tested with a 0.192 mm gap and a 100% strain based on the gap distance. Results are provided in FIGS. 5 and 6.

Figure 6:
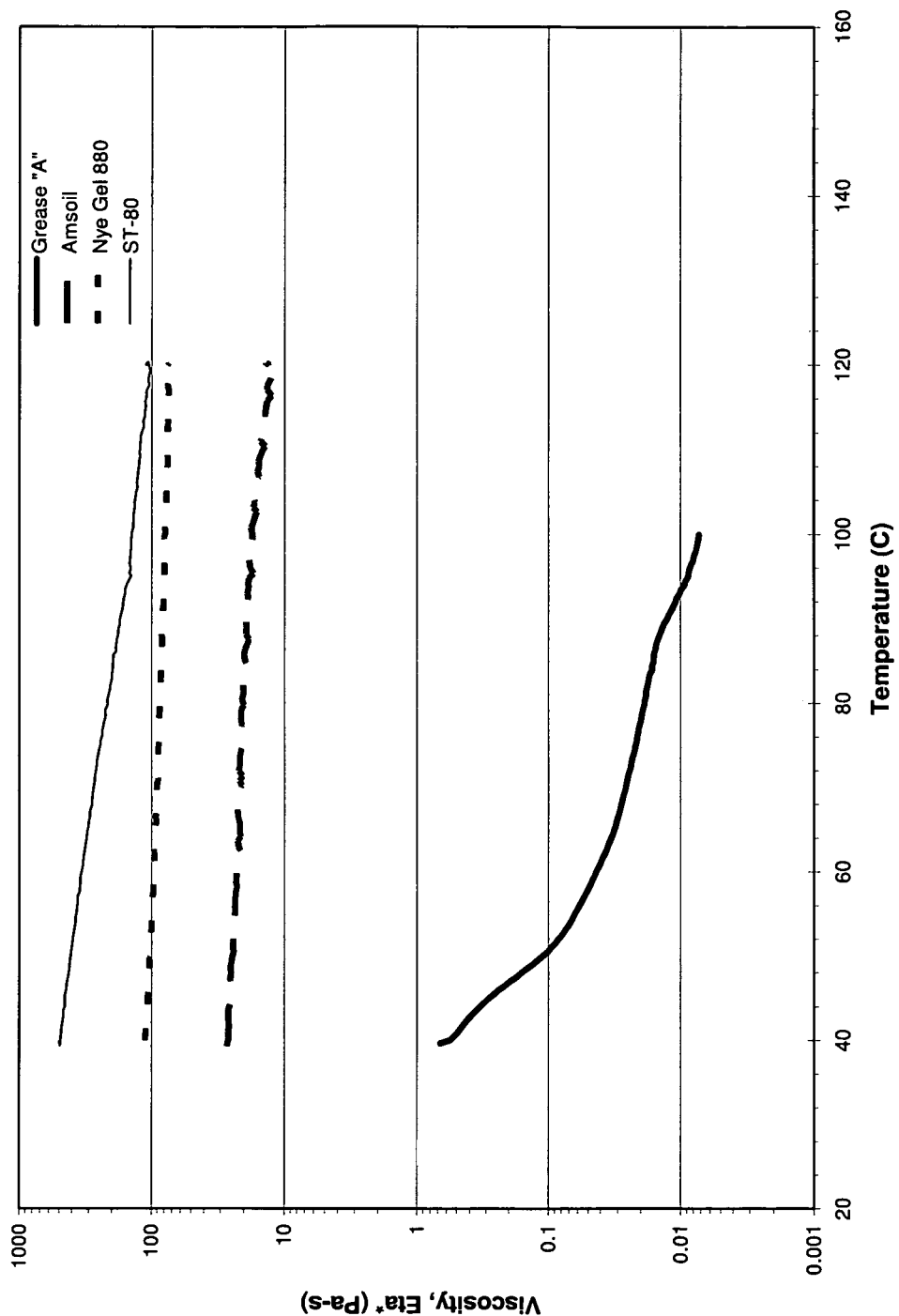
FIG. 6 is a graph illustrating the complex viscosity of one embodiment of a grease compared to three commercially available greases.

FIG. 6 graphically illustrates the complex viscosity for Grease A as well as for the three commercially available greases. A comparison of Grease A to the commercial greases shows that the complex viscosity of Grease A changes significantly (decrease) from 40° C. to 100° C.

Figure 7:
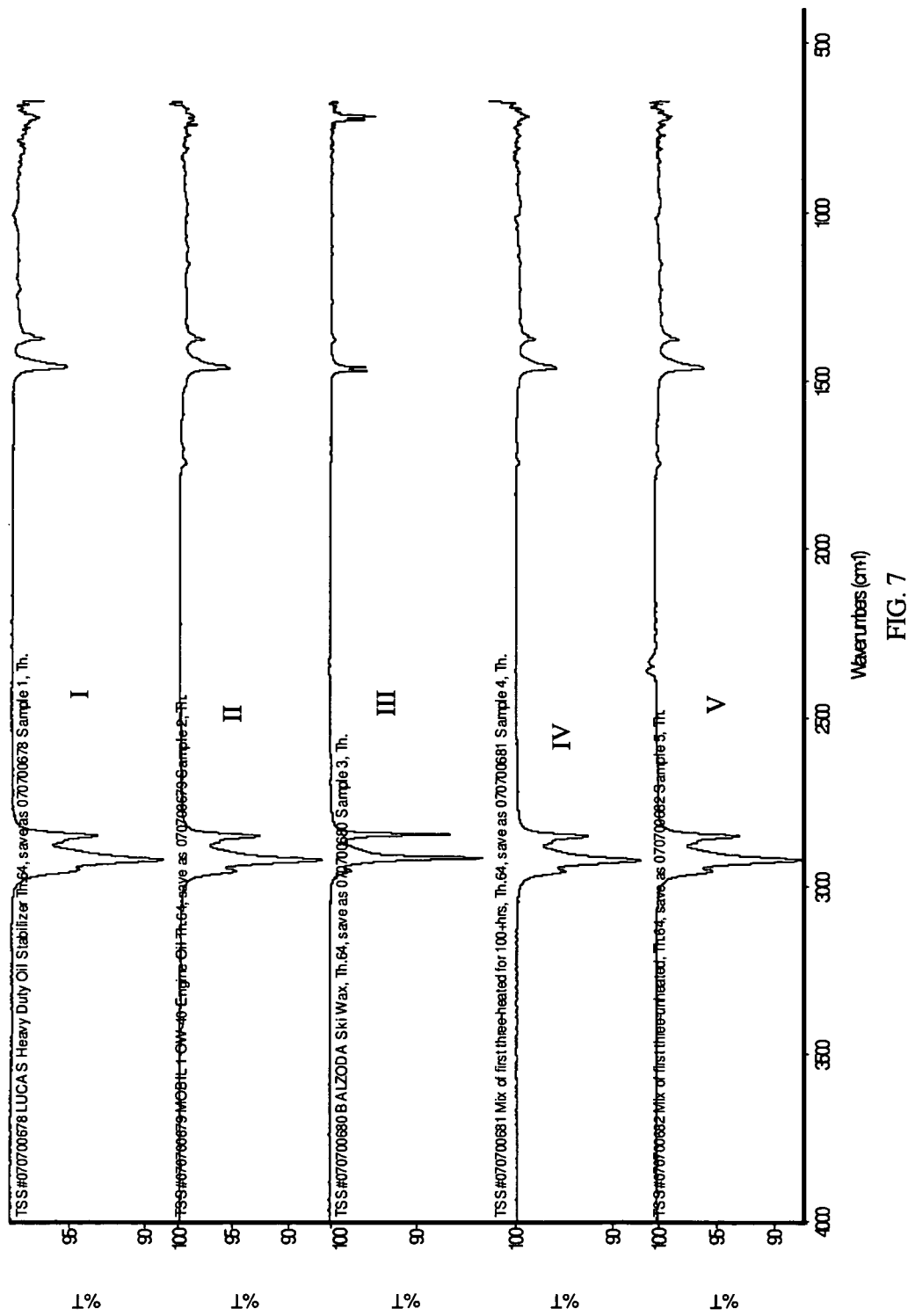
FIG. 7 provides FTIR data for an embodiment and its components.

FIG. 7 provides copies of spectrographs obtained from Fourier Transform Infrared Spectroscopy (FTIR) analysis performed on Lucas Heavy Duty Oil Stabilizer (I); Mobil 1 0W-40 synthetic oil (II); Bakoda cold temperature ski wax (III); Grease A1 after being heated for 100 hours (IV); and Grease A1 without being heated (V). The instrument used was a Nicolet 360 FT-IR AVATAR Infrared Spectrophotometer equipped with a single bounce ATR Thunderdome. The wavenumbers probed range from 4000-650 cm$^{-1}$ and the spectrum collected used 64 scans.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

All references, patents and patent applications and publications that are cited or referred to in this application are incorporated in their entirety herein by reference.

What is claimed is:

1. A high speed bearing grease composition comprising:
   more than 50% by volume of an oil fraction, wherein the oil fraction has a complex viscosity between 0.003 Pa s and 0.05 Pa s at 40 deg C.;
   more than 10% by volume of a paraffin wax, wherein the paraffin wax has a melting point in the range between 75 deg C. and 125 deg C.; and
   more than 5% hydrocarbon based oil stabilizer by volume, the oil stabilizer having a higher viscosity than the oil fraction, wherein the hydrocarbon based oil stabilizer comprises at least one alkanes from the group of C12 to C22, C23, C26, C27, and C28 alkanes, wherein the high speed bearing grease composition is essentially free of metallic soaps and polyurea.

2. The high speed bearing grease composition of claim 1, wherein the oil fraction comprises a polyalphaolefin formed from monomers of $C_6$, $C_7$, $C_8$, $C_9$, $C_{10}$, $C_{11}$, $C_{12}$, and/or $C_{16}$ α-olephins.

3. The high speed bearing grease composition of claim 2, wherein the polyalphaolefin has a D-445 viscosity of less than 100 cSt at 100° C.

4. The high speed bearing grease composition of claim 1, wherein the hydrocarbon based oil stabilizer comprises an extreme pressure additive.

5. The high speed bearing grease composition of claim 1, wherein the grease exhibits an ASTM D5483 oxidation induction time at 210° C. of greater than 5 minutes.

6. The high speed bearing grease composition of claim 1, wherein the grease exhibits an ASTM D5483 oxidation induction time at 210° C. of greater than 30 minutes.

7. The high speed bearing grease composition of claim 1, wherein the composition is essentially free of metallic soaps and polyurea.

8. The high speed bearing grease composition of claim 1, wherein the oil fraction is essentially free of polybutylene.

9. An electric motor comprising the high speed bearing of claim 1.

10. A bearing grease composition comprising:
    more than 60% by volume of an oil fraction comprising a hydrocarbon; wherein the oil fraction has a complex viscosity at 100° C. from 0.05 Pa-s to 0.003 Pa-s,
    more than 10% by volume of a paraffin wax, wherein the paraffin wax has a melting point in the range of 75° C. to 125° C.; and
    more than 5% hydrocarbon based oil stabilizer by volume, the oil stabilizer having a higher viscosity than the oil fraction, wherein the hydrocarbon based oil stabilizer comprises at least one alkanes from the group of C12 to C22, C23, C26, C27, and C28 alkanes,
    wherein the dynamic viscosity of the bearing grease is 10 times greater at 40° C. than at 70° C.,
    wherein the high speed bearing grease composition is essentially free of metallic soaps and polyurea.

11. The bearing grease of claim 10 wherein the hydrocarbon based oil stabilizer comprises an extreme pressure additive.

12. The bearing grease of claim 10 wherein the paraffin wax has a melting point in the range of 75° C. to 125° C.

13. The bearing grease of claim 10 wherein the hydrocarbon further comprises a polyalphaolefin.

14. The bearing grease of claim 13 wherein the polyalphaolefin has a D-445 viscosity greater than 10 cSt at 40° C.

15. A high speed bearing grease composition comprising:
    more than 60% and less than 70% synthetic hydrocarbon by volume, wherein the synthetic hydrocarbon comprises a polyalphaolefin having a D-445 viscosity of less than 100 cSt at 100° C.;
    more than 15% paraffin wax by volume, wherein the paraffin wax has a melting point in the range of 75 to 125° C.; and
    more than 5% hydrocarbon based oil stabilizer by volume, wherein the hydrocarbon based oil stabilizer comprises at least one alkanes from the group of C12 to C22, C23, C26, C27, and C28 alkanes, wherein the high speed bearing grease composition is essentially free of metallic soaps and polyurea.

16. The high speed bearing grease composition of claim 15, wherein the synthetic hydrocarbon comprises a polyalphaolefin formed from monomers of $C_6$, $C_7$, $C_8$, $C_9$, $C_{10}$, $C_{11}$, $C_{12}$, and/or $C_{16}$ α-olephins.

17. The high speed bearing grease composition of claim 15, further comprising a petroleum based oil stabilizer.

18. The high speed bearing grease composition of claim 15, wherein the grease exhibits an ASTM D5483 oxidation induction time at 210° C. of greater than 5 minutes.

* * * * *